United States Patent
Spadaccini et al.

(10) Patent No.: US 7,393,388 B2
(45) Date of Patent: Jul. 1, 2008

(54) SPIRAL WOUND FUEL STABILIZATION UNIT FOR FUEL DE-OXYGENATION

(75) Inventors: Louis J. Spadaccini, Manchester, CT (US); Harry Cordatos, Colchester, CT (US); Thomas Gregory Tillman, West Hartford, CT (US); Alexander G. Chen, Ellington, CT (US); Louis Chiappetta, South Windsor, CT (US); James R. Irish, Vernon, CT (US); Foster Phillip Lamm, South Windsor, CT (US); Stephen R. Jones, Columbia, CT (US)

(73) Assignee: United Technologies Corporation, Hartford, CT (US)

( * ) Notice: Subject to any disclaimer, the term of this patent is extended or adjusted under 35 U.S.C. 154(b) by 473 days.

(21) Appl. No.: 11/128,571

(22) Filed: May 13, 2005

(65) Prior Publication Data

US 2006/0254422 A1    Nov. 16, 2006

(51) Int. Cl.
*B01D 53/22* (2006.01)
*B01D 63/10* (2006.01)

(52) U.S. Cl. .................. 96/6; 96/7; 96/11; 96/12; 96/13; 96/14; 95/46; 95/54; 210/640; 210/497.1; 210/500.21

(58) Field of Classification Search ................ 96/4, 96/6, 7, 11, 12, 13, 14; 95/46, 54; 210/640, 210/497.1, 500.21; 55/520
See application file for complete search history.

(56) References Cited

U.S. PATENT DOCUMENTS

| | | | |
|---|---|---|---|
| 3,892,533 A * | 7/1975 | Freedman et al. | 96/6 |
| 4,033,878 A * | 7/1977 | Foreman et al. | 210/336 |
| 4,371,385 A | 2/1983 | Johnson | |
| 4,516,984 A | 5/1985 | Warner et al. | |
| 4,602,923 A | 7/1986 | Bernstein | |
| 4,729,773 A | 3/1988 | Shirato et al. | |
| 4,955,992 A | 9/1990 | Goodale et al. | |

(Continued)

FOREIGN PATENT DOCUMENTS

EP    0273267    7/1988

(Continued)

OTHER PUBLICATIONS

Baker, Richard W., Membrane Technology and Application, Second Edition, Membranes and Modules, pp. 140-143, John Wiley & Sons, Ltd.

(Continued)

*Primary Examiner*—Jason M Greene
(74) *Attorney, Agent, or Firm*—Carlson, Gaskey & Olds

(57) ABSTRACT

A deoxygenator includes a plurality of permeable membranes spirally wound about an exhaust tube for removing dissolved oxygen from a hydrocarbon fuel. The permeable membrane is spirally wrapped about the exhaust tube and defines fuel passages and exhaust passages. The fuel passages and exhaust passages alternate such that each fuel passage is bounded on each adjacent side by an exhaust passage. An oxygen partial pressure differential is generated across the permeable membrane to draw dissolved oxygen from fuel in the fuel passage. The dissolved oxygen is then communicated through openings about the circumference of the exhaust tube and out the deoxygenator.

17 Claims, 2 Drawing Sheets

U.S. PATENT DOCUMENTS

| | | | |
|---|---|---|---|
| 5,053,060 A | | 10/1991 | Kopf-Sill et al. |
| 5,069,793 A | * | 12/1991 | Kaschemekat et al. ...... 210/640 |
| 5,078,755 A | | 1/1992 | Tozawa et al. |
| 5,096,584 A | * | 3/1992 | Reddy et al. ............. 210/497.1 |
| 5,123,937 A | | 6/1992 | Shibata et al. |
| 5,154,832 A | * | 10/1992 | Yamamura et al. .......... 210/640 |
| 5,340,384 A | | 8/1994 | Sims |
| 5,410,052 A | | 4/1995 | Smith et al. |
| 5,482,860 A | | 1/1996 | Copeland et al. |
| 5,522,917 A | | 6/1996 | Honda et al. |
| 5,693,122 A | | 12/1997 | Berndt |
| 5,695,545 A | | 12/1997 | Cho et al. |
| 5,830,261 A | * | 11/1998 | Hamasaki et al. ................. 96/6 |
| 5,888,275 A | | 3/1999 | Hamasaki et al. |
| 5,902,382 A | | 5/1999 | Campain et al. |
| 5,902,747 A | | 5/1999 | Nemser et al. |
| 6,106,591 A | | 8/2000 | Keskar et al. |
| 6,168,648 B1 | * | 1/2001 | Ootani et al. ................... 95/46 |
| 6,258,154 B1 | | 7/2001 | Berndt et al. |
| 6,309,444 B1 | | 10/2001 | Sims et al. |
| 6,315,815 B1 | | 11/2001 | Spadaccini et al. |
| 6,379,796 B1 | | 4/2002 | Uenishi et al. |
| 6,402,810 B1 | | 6/2002 | Mayer et al. |
| 6,402,818 B1 | | 6/2002 | Sengupta |
| 6,494,938 B2 | | 12/2002 | Sims et al. |
| 6,616,841 B2 | | 9/2003 | Cho et al. |
| 6,623,637 B1 | | 9/2003 | Monzen et al. |
| 6,682,016 B1 | | 1/2004 | Peroulakis |
| 6,709,492 B1 | * | 3/2004 | Spadaccini et al. ................ 96/6 |
| 2001/0035093 A1 | | 11/2001 | Yokota |
| 2002/0195385 A1 | | 12/2002 | Cho et al. |
| 2003/0116015 A1 | | 6/2003 | Sengupta et al. |
| 2003/0148164 A1 | | 8/2003 | Koch et al. |
| 2003/0151156 A1 | | 8/2003 | Crumm et al. |
| 2003/0161785 A1 | | 8/2003 | Dieckmann |
| 2003/0219637 A1 | | 11/2003 | Coors |
| 2004/0025696 A1 | | 2/2004 | Varrin, Jr. et al. |
| 2004/0028988 A1 | | 2/2004 | Bunker |
| 2004/0050786 A1 | | 3/2004 | Dey et al. |
| 2004/0094463 A1 | | 5/2004 | Laverdiere et al. |
| 2004/0194627 A1 | | 10/2004 | Huang et al. |

FOREIGN PATENT DOCUMENTS

| | | |
|---|---|---|
| EP | 0354797 | 2/1990 |
| EP | 0 448 973 | 10/1991 |
| EP | 0460512 | 12/1991 |
| EP | 0493869 | 7/1992 |
| EP | 0552090 | 7/1993 |
| EP | 0576677 | 1/1994 |
| EP | 0583748 | 2/1994 |
| EP | 0622475 | 11/1994 |
| EP | 0750322 | 12/1996 |
| EP | 0963229 | 8/1998 |
| EP | 09070738 | 1/2000 |
| EP | 1018353 | 7/2000 |
| EP | 1052011 | 11/2000 |
| EP | 1210971 | 6/2002 |
| EP | 1239189 | 9/2002 |
| EP | 1270063 | 1/2003 |
| EP | 1277504 | 1/2003 |
| JP | 63151307 | 6/1988 |
| JP | 3169304 | 7/1991 |
| JP | 3193106 | 8/1991 |
| JP | 3-278805 | * 12/1991 |
| JP | 03 278805 | 12/1991 |
| JP | 5084474 | 4/1993 |
| JP | 5317605 | 12/1993 |
| JP | 7080205 | 3/1995 |
| JP | 7227504 | 8/1995 |
| JP | 8000906 | 1/1996 |
| JP | 8332306 | 12/1996 |
| JP | 10174803 | 6/1998 |
| JP | 10216404 | 8/1998 |
| JP | 11009902 | 1/1999 |
| JP | 11033373 | 2/1999 |
| JP | 11244607 | 9/1999 |
| JP | 2000051606 | 2/2000 |
| JP | 2000084368 | 3/2000 |
| JP | 20000140505 | 5/2000 |
| JP | 2000 176256 | 6/2000 |
| JP | 20000262871 | 9/2000 |
| JP | 2000288366 | 10/2000 |
| JP | 2000350902 | 12/2000 |
| JP | 2003010604 | 1/2003 |
| JP | 2003062403 | 3/2003 |
| JP | 2003200024 | 7/2003 |
| JP | 2003245525 | 9/2003 |
| WO | WO 94/16800 | 8/1994 |
| WO | WO 97/02190 | 1/1997 |
| WO | WO 98/34709 | 8/1998 |
| WO | WO 99/39811 | 8/1999 |
| WO | WO 00/44479 | 8/2000 |
| WO | WO 00/44482 | 8/2000 |
| WO | WO 02/062446 | 8/2002 |
| WO | WO 03/029744 | 4/2003 |
| WO | WO 03/036747 | 5/2003 |
| WO | WO 03/080228 | 10/2003 |
| WO | WO 03/086573 | 10/2003 |
| WO | WO 2004/007060 | 1/2004 |
| WO | WO 2004/041397 | 5/2004 |

OTHER PUBLICATIONS

W.S.Winston Ho, Ph.D and Kamalesh K. Sirkar, Ph.D; Membrane Handbook, Design of Gas Permeation Systems, pp. 63-64, Kluwer Academic Publishers, Boston.

Kirk-Othmer Encyclopedia of Chemical Technology, Fourth Edition, vol. 16, Membrane Technology, pp. 135, 158-160, 1995, John Wiley & Sons, Inc.

Li et al., Optimization of non-woven spacers by CFD and validation by experiments, pp. 210-212, 2002, Elsevier Science B.V.

Schwinge et al., Journal of Membrane Science, Spiral wound modules and spacers Review and Analysis, pp. 129-153, 2002, Elsevier B.V.

Lipnizki et al., Flow dynamics and concentration polarisation in space-filled channels, pp. 213-217, 2002, Elsevier Science B.V.

Darrah, Jet Fuel Deoxygenation, Interim Report for Period Mar. 1987-Jul. 1988, Aero Propulsion Laboratory, pp. 1-22.

Spadaccini et al., On-Line Fuel Deoxygenation for Coke Suppression, Proceeding of Turbo Expo 2002, pp. 1-7, 2002, ASME.

GE Infrastructure Water & Process Technologies Website, Spiral Wound Sepralators The Range of Options, Mar. 17, 2005, www.gewater.com/library/tp/831_Spiral-Wound_Sepralators.jsp.

European Search Report dated Oct. 25, 2006.

Baker, Richard W., Membrane Technology and Application, Second Edition, Membranes and Modules, pp. 140-143, John Wiley & Sons, Ltd, no date.

W.S.Winston Ho, Ph.D and Kamalesh K. Sirkar, Ph.D; Membrane Handbook, Design of Gas Permeation Systems, pp. 63-64, Kluwer Academic Publishers, Boston, no date.

Darrah, Jet Fuel Deoxygenation, Interim Report for Period Mar. 1987-Jul. 1988, Aero Propulsion Laboratory, pp. 1-22, 1988.

* cited by examiner

SPIRAL WOUND FUEL STABILIZATION UNIT FOR FUEL DE-OXYGENATION

BACKGROUND OF THE INVENTION

This invention relates generally to a method and device for removing dissolved oxygen from fuels and more particularly to a spirally wound membrane for removing dissolved oxygen from liquid hydrocarbon fuels.

Fuel can be utilized as a cooling medium for various systems of an energy conversion device. However, increasing the temperature of fuel also increases the rate at which oxidative reactions occur. The usable cooling capacity of a particular fuel is limited by coke formation and deposition, which is dependent on the amount of dissolved oxygen present within the fuel due to prior exposure to air. Reduction of the amount of dissolved oxygen within the fuel can result in the reduction of coke formed within a fuel delivery system of the energy conversion device.

Decreasing the amount of dissolved oxygen present within fuel reduces the formation of insoluble products referred to as "coke" or "coking". Reducing the amount of oxygen dissolved within the fuel decreases the rate of coke deposition and increases the maximum allowable temperature. In other words, the less dissolved oxygen within the fuel, the higher the temperature before coke buildup becomes a problem. For many fuels, in order to suppress coke deposition, it is generally agreed that the concentration of dissolved oxygen should be reduced below approximately 2 ppm or approximately three percent of saturation although the degree of de-oxygenation will also depend on the amount of heating the fuel will subsequently undergo. For moderate temperatures, less de-oxygenation would be required and for fuels operating at high temperatures (up to 800 F) dissolved oxygen levels below 2 ppm would be desirable. Fuels that currently have improved coking performance are generally more expensive or require additives, and therefore are not always available.

Known devices for removing dissolved oxygen include a gas-permeable membrane disposed within the fuel system. Fuel passes along the permeable membrane, oxygen molecules in the fuel dissolve into the membrane and then diffuse across it and are removed. A vacuum or oxygen partial pressure differential across the permeable membrane drives oxygen from the fuel, which is unaffected and passes over the membrane.

As is appreciated permeable membranes are difficult to manufacture and are limited in size and construction by sizing and economic factors. Membrane bundles are difficult to scale because performance is highly dependent on spacing and geometry and thus hard to predict. High pressures are also a concern with membrane construction. Further, space and weight are driving factors for any system, and any reduction in space and weight provide immediate benefits to operation.

Accordingly it is desirable to design a permeable membrane system that can remove dissolved oxygen from fuel down to the level required to suppress coke formation, and to configure it such that it efficiently utilizes space, reduces weight, is easily scalable, performs predictably, and can be manufactured economically.

SUMMARY OF THE INVENTION

This invention is a deoxygenator including a plurality of permeable membranes spirally wound about an exhaust tube for removing dissolved oxygen from a hydrocarbon fuel.

The example spiral fuel deoxygenator includes the exhaust tube disposed within a housing. The housing defines an inlet and an outlet for fuel flow. A plurality of permeable membranes is spirally wrapped about the exhaust tube. The permeable membranes correspond with each other to form fuel and exhaust passages.

The fuel passages and exhaust passages alternate such that each fuel passage is bounded on each adjacent side by an exhaust passage. An oxygen partial pressure differential is generated across the permeable membrane to draw dissolved oxygen from fuel in the fuel passage. The dissolved oxygen is then communicated through openings about the circumference of the exhaust tube and out an open end.

Each of the permeable membranes are disposed between a membrane spacer and a fuel channel spacer. The membrane spacers define the exhaust passage for dissolved oxygen to move toward the exhaust tube and out of the deoxygenator. The fuel channel spacer defines the fuel passage through which fuel flows axially through the deoxygenator from the inlet to the outlet.

Accordingly, the deoxygenator of this invention provides a permeable membrane system that can remove dissolved oxygen from fuel down to the level required to suppress coke formation, and that is configurable to efficiently utilize space, reduce weight, is easily scalable, performs predictably, and that can be manufactured economically.

These and other features of the present invention can be best understood from the following specification and drawings, the following of which is a brief description.

DETAILED DESCRIPTION OF THE PREFERRED EMBODIMENT

Figure 1:
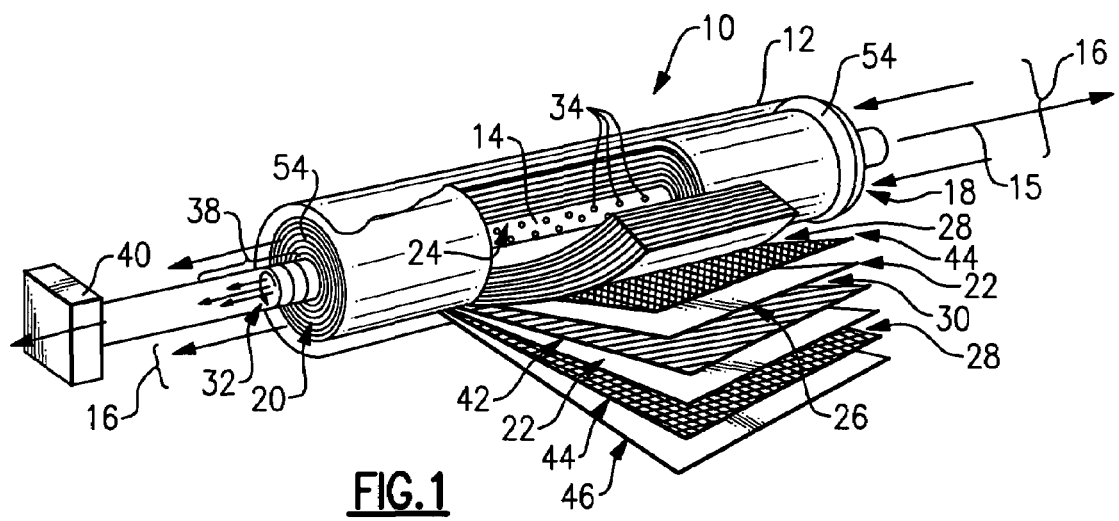
FIG. 1 is a partially exploded view of an example spirally wound deoxygenator.

Referring to FIG. 1 a spiral wound fuel deoxygenator 10 includes an exhaust tube 14 disposed along axis 15 within a housing 12. The housing 12 defines an inlet 18 and outlet 20 for fuel flow 16. Fuel flow 16 entering the inlet 18 including some portion of dissolved oxygen 38. A permeable membrane 22 is spirally wrapped about the exhaust tube 14. The example permeable membrane 22 is a sheet having a first end 24 attached to the exhaust tube 14 and a second end 26 spirally wrapped about the exhaust tube 14. The example deoxygenator 10 includes a plurality of permeable membranes 22 that correspond with each other to form fuel passages 28 and exhaust passages 30.

The fuel passages 28 and exhaust passages 30 alternate such that each fuel passage 28 is bounded on each adjacent side by an exhaust passage 30. An oxygen partial pressure differential is generated across the permeable membrane 22 to draw dissolved oxygen 38 from fuel in the fuel passage 28. In the example embodiment, the oxygen partial pressure differential is generated by a vacuum source 40. The dissolved oxygen 38 is then communicated through openings 34 about the circumference of the exhaust tube 14 and out an open end 32. A seal 54 is provided at each axial end of the deoxygenator 10 to seal off the exhaust passages 30. Accordingly, the fuel 16 leaving the deoxygenator 10 includes substantially less dissolved oxygen than fuel entering.

Each of the permeable membranes 22 is disposed between a membrane spacer 42 and a fuel channel spacer 44. The membrane spacers 42 define the exhaust passage 30 for dissolved oxygen 38 to move toward the exhaust tube 14 and out of the deoxygenator 10. The fuel channel spacer 44 defines the fuel passage 28 through which fuel flows axially through the deoxygenator 10 from the inlet 18 to the outlet 20. An outer wrap 46 maintains the desired circumference of the plurality of permeable membranes 22 for assembly into the housing 12. While in this figure the outer wrap is in contact with a fuel passage, it can also be in contact with a vacuum passage.

Figure 2:
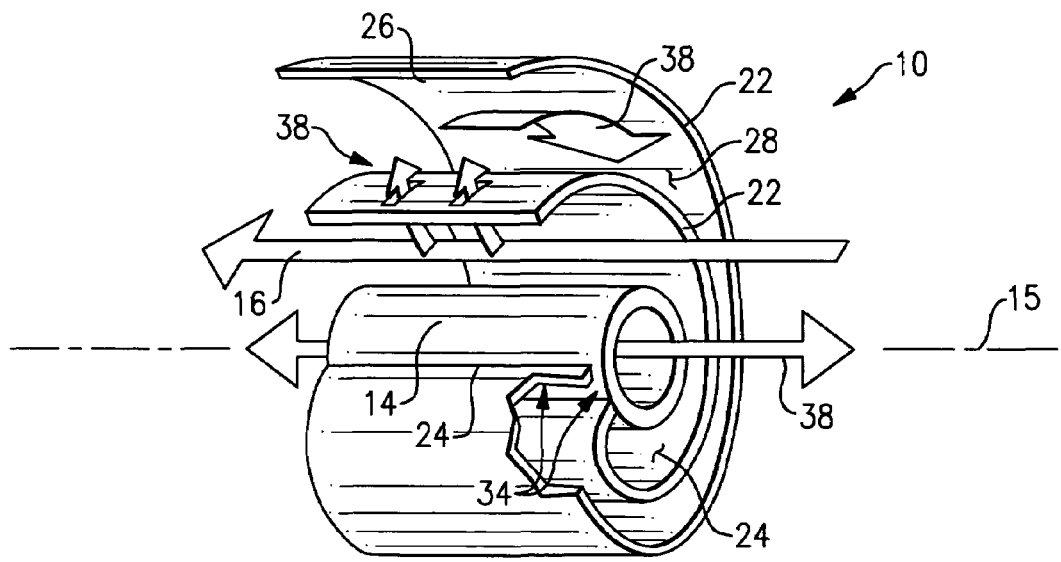
FIG. 2 is a schematic view of fuel and dissolved oxygen flow through the example spirally wound deoxygenator.

Referring to FIG. 2, exhaust dissolved oxygen 38 flows circumferentially within spirally formed passages that terminate at the exhaust tube 14. The openings 34 are placed in communication with the exhaust passages 30 and are not in communication with the fuel passages 28. The second end 26 of the permeable membranes 22 are sealed such that each membrane spacer 42 defines a single spiral shaped exhaust passage 30. The spiral shaped exhaust passage 30 begins at the second end 26 and wraps about the exhaust tube 14 until terminating at the surface of the exhaust tube 14 and in communication with one of the plurality of openings 34.

The fuel passages 28 are defined between the permeable membranes 22 by the fuel spacers 44. Fuel flows axially within the fuel passages 28 through the deoxygenator 10. Fuel within the fuel passages contact and flow against the permeable membranes 22 such that dissolved oxygen 38 is drawn from the fuel and through the permeable membranes 22 into the exhaust passages 30.

Figure 3:
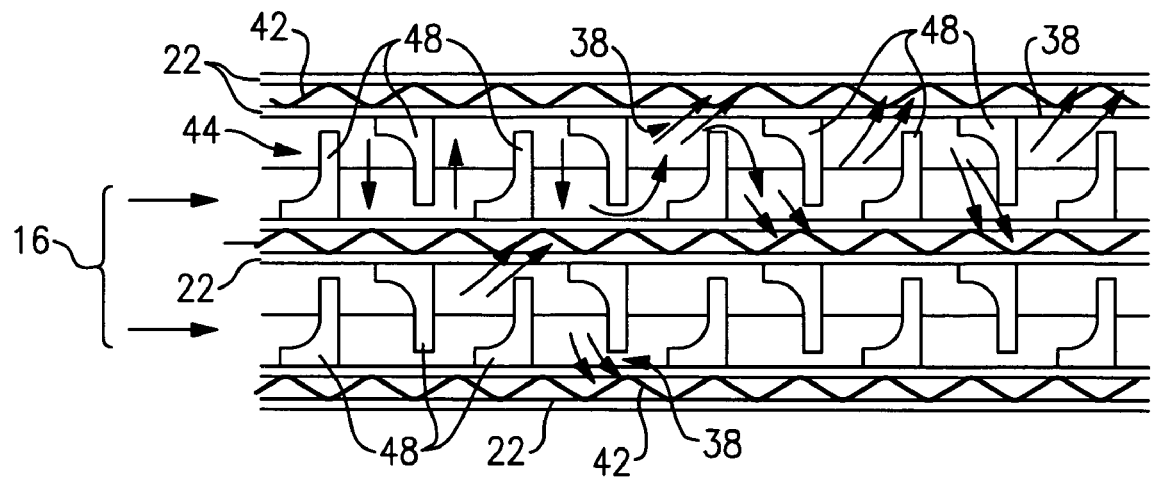
FIG. 3 is a cross-section of a portion of an example exhaust passage and fuel passage.

Referring to FIG. 3, the fuel passages 28 are defined by the fuel spacer 44. The example fuel spacer 44 includes a plurality of baffles 48 for directing the flow of fuel. The baffles 48 direct fuel flow alternately against opposing permeable membranes 22 to increase the transport of dissolved oxygen 38 from the fuel. The increased transport of oxygen is enhanced by optimizing fuel contact with a surface of the permeable membrane 22. The example baffles 48 are L-shaped and include a curved surface that directs fuel flow transverse to the axis 15 of the deoxygenator 10. The transverse flow enhances contact with the permeable membrane 22 and thereby increases the efficiency of the deoxygenator 10. In the preferred embodiment, the example fuel spacer 44 is fabricated from a plastic material in a sheet form and layered between adjacent sheets of the permeable membranes 22. Although, an example configuration for the baffles 48 are shown, other shapes and configurations for enhancing fuel contact with the permeable membrane 22 are within the contemplation of this invention.

The exhaust passage 30 is defined by the membrane spacer 42. The membrane spacer 42 is a screen or porous material that provides a desired spacing between adjacent permeable membranes 22. The desired spacing defines a desired volume of the exhaust passages 30. The exhaust passages 30 terminate in communication with openings 34 of the exhaust tube 14 (FIG. 2).

The vacuum source 40 (FIG. 1) generates the desired oxygen partial pressure differential that is communicated through the exhaust tube 14 and thereby throughout the exhaust passages 30. The membrane spacer 42 includes features to minimize any resistance to dissolved oxygen flow. The example membrane spacer 42 is fabricated from a plastic material. Further, a worker skilled in the art would understand that other materials and configuration for the membrane spacer 42 are within the contemplation of this invention.

Further, a strip gas may also be utilized to generate the partial pressure oxygen differential. Accordingly, the exhaust tube 14 may include a second open end and a strip gas flowed axially through the exhaust tube 14 to draw dissolved oxygen from fuel adjacent the permeable membranes 22.

Figure 4:
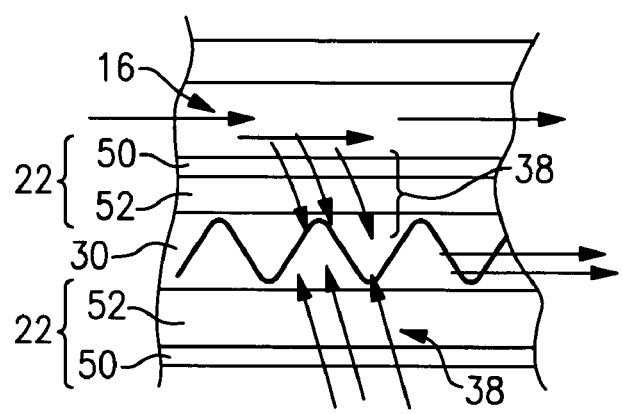
FIG. 4 is a cross-section of an example permeable membrane.

Referring to FIG. 4, the permeable membrane 22 includes a permeable layer 50 disposed over a porous backing 52. The porous backing 52 provides the required support structure for the permeable layer 50 while still allowing maximum oxygen diffusion from the fuel passage 28. The permeable layer 50 is coated on to the porous backing 52 and a mechanical bond between the two is formed. The permeable layer 50 is preferably a 0.5-20 μm thick coating of Teflon AF 2400 over a 0.005-in thick porous backing 52 of polyvinylidene fluoride (PVDF) or polyetherimide (PEI) with a 0.1-0.3 μm pore size. Other supports of different material, thickness and pore size can be used that provide the requisite strength and openness.

Preferably the permeable layer 50 is Dupont Teflon AF amorphous fluoropolymer; however other materials known to workers skilled in the art are within the contemplation of this invention, such as Solvay Hyflon AD perfluorinated glassy polymer and Asahi Glass CYTOP polyperfluorobutenyl vinyl ether. The porous backing 52 is flexible to provide for spiral wrapping about the exhaust tube 14.

The deoxygenator 10 comprises a plurality of the permeable membranes 22 bonded on the first end 24 to the exhaust tube 14. The permeable membranes 22 are then alternately sandwiched between membrane spacers 42 and fuel spacers 44. The fuel spacers 44 are placed in contact with the permeable layer 50 of each permeable membrane 22 and the membrane spacers 42 are disposed between opposing porous backings 52. The resulting sandwich of alternating layers of permeable membranes 22, membrane spacers 42 and fuel spacers 44 is then wound about the exhaust tube 14 to a desired circumference. The second end 26 of each of the permeable membranes 22 is then sealed such that exhaust flow may only exit through the openings 34 of the exhaust tube 14 that are adjacent the first end 24 that is adjacent the axis 15 of the deoxygenator 10.

The seal 54 seals the sides of the exhaust passages 30 adjacent axial ends of the deoxygenator 10 to further close off the exhaust passage 30. The seal 54, however, does not seal axial ends of the fuel passages 28 providing for the desired axial flow of fuel through the deoxygenator 10. The spiral wound permeable membranes 22 are received within the housing 12 that defines the inlet 18 and outlet 20 for fuel flow.

The number and size of the permeable membranes 22 may be adjusted to scale the deoxygenator 10 to application specific requirements. The deoxygenator 10 may be sized to minimize pressure loss, maximize dissolved oxygen removal or to fit within a specified design envelope. The scale of the deoxygenator 10 can be modified by varying the axial length and by varying the length of the permeable membranes 22 or by varying the number of permeable membranes 22 and varying a diameter of the deoxygenator 10.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A fuel deoxygenator assembly comprising:
 a housing having an inlet and an outlet,
 an exhaust tube disposed within said housing and having at least one open end extending from said housing;
 a first passage for fuel defined by a fuel channel spacer through said housing between said inlet and said outlet, wherein said fuel channel spacer includes a plurality of members extending from sides of said first passage to induce mixing and direct fuel toward sides of said frst passage;

a permeable membrane spirally wrapped about said exhaust tube within said housing and disposed adjacent fuel flowing through said first passage, wherein said permeable membrane comprises a fluoropolymer coating supported on a porous backing with the fluropolymer coating defining said sides of said first passage; and a second passage defined by a membrane spacer and bounded on each side by the porous backing of the permeable membrane for communicating with said at least one open end of said exhaust tube and creating an oxygen partial pressure differential to draw dissolved oxygen from said fuel through said permeable membrane into said second passage and out said at least one open end of said exhaust tube.

2. The assembly as recited in claim 1, wherein said permeable membrane includes a first end attached to said exhaust tube.

3. The assembly as recited in claim 1, wherein said fuel channel spacer is sandwiched between spirally wound layers of said permeable membrane such that said permeable membrane defines a portion of said first passage.

4. The assembly as recited in claim 1, wherein said permeable membrane comprises a fluoropolymer coating over a porous backing.

5. The assembly as recited in claim 1, further comprising a perfluorinated glassy polymer disposed on said permeable membrane.

6. The assembly as recited in claim 1, further comprising an polyperfluorobutenyl vinyl ether disposed on said permeable membrane.

7. The assembly as recited in claim 1, including a vacuum provided at said at least one open end for generating said oxygen partial pressure differential across said permeable membrane.

8. The assembly as recited in claim 1, including a second opening for a flow of strip gas through said exhaust tube and in communication with said porous backing creating said oxygen partial pressure differential.

9. The assembly as recited in claim 1, wherein said permeable membrane comprises amorphous fluoropolymer.

10. The assembly as recited in claim 1, wherein said permeable membrane comprises a polytetraflouroethylene.

11. The assembly as recited in claim 1, wherein a thickness of said permeable membrane is about four microns.

12. The assembly as recited in claim 1, wherein a thickness of said permeable membrane is between 1 and 4 microns.

13. The assembly as recited in claim 1, wherein a thickness of said permeable membrane is less than four microns.

14. The assembly as recited in claim 1, wherein approximately 97% or more of the dissolved oxygen is removed from the fuel within said fuel passages.

15. The assembly as recited in claim 1, wherein the fuel within said fuel passages is approximately 200 degrees Fahrenheit.

16. The assembly as recited in claim 1, wherein the fuel within said fuel passage is more than about 150 degrees Fahrenheit.

17. The assembly as recited in claim 1, wherein approximately 80% or more of the dissolved oxygen is removed from the fuel within said fuel passages.

* * * * *

UNITED STATES PATENT AND TRADEMARK OFFICE
CERTIFICATE OF CORRECTION

PATENT NO. : 7,393,388 B2 Page 1 of 1
APPLICATION NO. : 11/128571
DATED : July 1, 2008
INVENTOR(S) : Spadaccini et al.

It is certified that error appears in the above-identified patent and that said Letters Patent is hereby corrected as shown below:

Claim 1, Column 5, line 2: "fist" should read as --first--

Signed and Sealed this

Twenty-third Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,393,388 B2 Page 1 of 1
APPLICATION NO. : 11/128571
DATED : July 1, 2008
INVENTOR(S) : Spadaccini et al.

It is certified that error appears in the above-identified patent and that said Letters Patent is hereby corrected as shown below:

Claim 1, Column 5, line 37: "fist" should read as --first--

This certificate supersedes the Certificate of Correction issued September 23, 2008.

Signed and Sealed this

Fourteenth Day of October, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,393,388 B2 |
| APPLICATION NO. | : 11/128571 |
| DATED | : July 1, 2008 |
| INVENTOR(S) | : Spadaccini et al. |

Page 1 of 1

It is certified that error appears in the above-identified patent and that said Letters Patent is hereby corrected as shown below:

ON THE TITLE PAGE:

Please add the following inventor:

(75) Inventors: Ingo Pinnau, Menlo Park, CA (US)

Signed and Sealed this

Twenty-third Day of June, 2009

JOHN DOLL
*Acting Director of the United States Patent and Trademark Office*